Patented Jan. 29, 1952

2,583,684

UNITED STATES PATENT OFFICE 2,583,684

METHOD OF TREATING GLUTEN-BEARING STARCHY MATERIAL

Leo M. Christensen, Lincoln, Nebr., assignor, by mesne assignments, to Gateway Chemurgic Company, Lincoln, Nebr., a corporation of Nebraska No Drawing. Application September 30, 1946, Serial No. 700,353

10 Claims. (Cl. 195—4)

This invention relates to a method of treating gluten-bearing starchy material for the production of syrups or alcohol.

It has been found, as is more particularly disclosed in U. S. Patent 2,342,330, that in the process of producing alcohol by saccharification of starch with enzymes and subsequent fermentation of the saccharified mash that losses are incurred in cooling the cooked mash down to saccharification temperatures. These losses are found to be apparently due to an irreversible hydration of the starch during the orthodox step of slowly cooling the cooked starch from temperatures of the order of 100° C. and above down to the optimum saccharification temperature. The optimum saccharification temperature, as those skilled in the art know, is about 60° C. for malt and about 55° C. for mold bran. The irreversible hydration mentioned appears to commence when the mash temperature is about 80° C.

It was disclosed in the prior patent that losses resulting from this irreversible hydration of starch could be substantially minimized by very rapidly cooling the mash down through the temperature range at which this phenomenon obtained. This cooling was conducted at such a rate that the temperature of the cooked mash was reduced to about 55° C. in a period of 15 minutes or less.

It has also been found, as disclosed in U. S. Patent 2,348,451, that this irreversible hydration could be substantially inhibited by carrying out the cooking in an acid medium under conditions which lead to conversion of the starch to dextrins or dextrin-like compounds which does not undergo this type of hydration.

It has now been found that such irreversible hydration of starch is a factor of very important economic significance in the production of sugar syrups and/or alcohol from wheat or similar gluten-bearing materials. To render such a process economically advantageous and competitive it is highly important to recover the gluten content of the wheat. This commands a good price both for a high protein feed and as a starting material for glutamic derivatives.

It has been ascertained that if wheat is employed as a starting material and is processed in the usual manner to produce alcohol, i. e., by heating to the gelation range, cooking at elevated temperatures, slow cooling down to saccharification temperatures followed by inoculation with enzymatic material that the separation of the gluten in the cooked or partially cooked mash is extremely difficult. The retrograded starch presents hydrophilic properties and tends to coat or slime the gluten particles forming thereby a mass which separates with difficulty from the remainder of the mash and dewaters very slowly. It has been discovered that if the mash is cooked under physical or chemical conditions which are so controlled as to prevent or inhibit the formation of the retrograded starch the gluten may readily be separated as a readily drainable granular material. The present invention, therefore, comprehends the concept of cooking gluten-containing material under conditions controlled to substantially prevent retrogradation of starch to thereby positively establish the gluten content in such physical condition as to insure its substantially quantitative separation by simple mechanical means.

As explained heretofore this may be done by utilizing a number of expedients such as the rapid cooling of the cooked mash from cooking temperature down through the retrogradation temperature. Again, as explained in U. S. Patent 2,348,451, such retrogradation may be prevented by acid cooking the mash, that is to say, by adjusting the mash to between pH 1.6 to pH 2.5 and preferably between pH 1.8 to 2.0. Cooking in such an acid medium, as disclosed in the prior patent, avoids the formation of any substantial amounts of the undesired retrograded starch and thus prevents sliming and cohesion of the gluten particles. Again, as pointed out in co-pending application, Serial No. 653,433, filed March 9, 1946, now abandoned this retrogradation of starch may be avoided by utilizing a thermostable enzymatic material such as bacterial saccharifying amylase which is active within that temperature range at which starch degradation occurs. In this type of operation the cooked mash may be cooled, either rapidly or slowly, down to a temperature of about 80° C., inoculated with a thermostable bacterial amylase and allowed to saccharify at the addition temperature or any lower temperature.

In the preferred mode of operation the advantages of both acid cooking and quick cooling are invoked so as to produce a gluten-containing mash, the gluten content of which is readily separable by the most simple form of apparatus, such for example as on a vibrating screen. In such preferred mode of operation 1 part of a gluten-containing material, such as granular wheat flour, is cooked in 2 parts of .08N hydrochloric acid or a sulphuric acid solution of equivalent acidity. It will be found advantageous to first heat up the acid solution to a temperature of about 180° C. to 200° C. and to add the granular wheat flour to such hot acid with continuous strong agitation to insure very rapid gelation of the starch. A desirable variant of such a method is to first wet the wheat flour with a portion of the aqueous medium and add the prewetted flour to the remaining hot acid solution. After thorough mixing of the starchy material the mash is heated to a temperature of approximately 120° C. for a period of from 45 to 60 minutes or, if desired, at a higher temperature for a commensurately shorter period of time. After such cooking the temperature is reduced to 100° C. by any appropriate method such as vacuum cooling, direct or indirect heat exchange and the like. The mash is then neutralized to pH 5.5, to insure subsequent optimum enzymatic action, and the adjusted mash is rapidly cooled down to the optimum saccharification temperature for the particular amylase material which is to be utilized. This quick cooling may be achieved by adding substantially 2 parts of cold water to the cooked mash which water contains the homogeneously dispersed saccharifying enzymatic material. Where barley malt is employed this is added in the proportion of substantially 10% of malt on the dry basis of the original starchy material; when mold bran is utilized only about 4% need be employed; equivalent results may be obtained by using mixtures of mold bran and barley malt. In order to insure the best separation of the gluten it is important that the saccharifying mash be held under optimum saccharifying conditions for a period of time sufficiently prolonged to secure substantially complete saccharification. Under conditions specified above such complete saccharification is achieved by holding the mash at the optimum temperature for a period of from between 60 to 90 minutes.

At the end of this period the saccharified mash is then discharged onto a vibrating screen. It is found that the aqueous solution rapidly drains leaving the gluten in non-mucilaginous condition retained on the screen. After complete draining of the solution the gluten is washed on the screen and is removed for dewatering. This may be done in any suitable apparatus such as vacuum driers, hot air tunnels and the like.

With this type of operation it will be found that a substantially quantitative recovery of gluten is insured. Operating under the conditions mentioned above from 4 to 8 pounds of gluten may be recovered per bushel of wheat in the original charge. The sugar solution recovered from the vibrating screen may be cooled to yeasting temperature and then yeasted to produce alcohol. Again, if sugar syrup is the desired ultimate product such solution may be evaporated to produce clarified syrups of high sweetening power. In the operation described from 34 to 38 pounds of 43° Bé. syrup is producible per bushel of the starchy starting material.

It will be appreciated that the present invention presents decided economic advantages. The separation of gluten from partially saccharified or completely saccharified mash has been difficult in the past due to the fact that in the orthodox procedures the mucilaginous retrograded starch was produced which served as a bonding agent for the gluten rendering its separation from the sugar solution protracted and expensive. According to the present invention by invoking the concept of inhibiting or preventing such starch retrogradation sugar syrups containing very readily separable gluten may be directly produced with the advantage of a high yield of both sugar and gluten coupled with very low separating costs of these two components of the system.

I claim:

1. A method of producing gluten and sugar solutions from gluten-bearing starchy material which comprises, cooking the starchy material at acid reaction at from pH 1.6 to pH 2.5 to sterilize and gelatinize the starchy material, neutralizing the mash to about pH 5.5, cooling the cooked mash down to the optimum saccharification temperature of a selected amylase employed and between about 60° C. and 55° C. within a period of about 15 minutes to avoid any substantial formation of retrograded starch, saccharifying the cooled mash with a selected enzymatic saccharifying agent chosen from the group consisting of a vegetable amylase and a fungal amylase at said optium saccharification temperatures for a period of from about 60 minutes to about 90 minutes, separating and recovering gluten and an aqueous sugar solution.

2. A process in accordance with claim 1 in which the saccharifying agent is a vegetable amylase.

3. A process in accordance with claim 1 in which the enzymatic saccharifying agent is barley malt.

4. A process in accordance with claim 1 in which the saccharifying agent is a fungal amylase.

5. A process in accordance with claim 1 in which the saccharifying agent is mold bran.

6. A method of producing gluten and sugar solutions from gluten-bearing material which comprises, cooking the material to sterilize and gelatinize the starch, adjusting the mash to about pH 5.5, rapidly cooking the cooked mash down to the optimum saccharification temperature of a selected amylase employed and between about 60° C. and 55° C. within a period of about 15 minutes to avoid any substantial formation of retrograded starch, saccharifying the cooled mash with a saccharifying agent chosen from the group consisting of a vegetable amylase and a fungal amylase at said optimum saccharification temperature for a period sufficiently prolonged to insure substantially complete saccharification and screening the gluten from the saccharified mash.

7. A process in accordance with claim 6 in which the saccharifying agent is a vegetable amylase.

8. A process in accordance with claim 6 in which the saccharifying agent is barley malt.

9. A process in accordance with claim 6 in which the saccharifying agent is a fungal amylase.

10. A process in accordance with claim 6 in which the saccharifying agent is mold bran.

LEO M. CHRISTENSEN.

REFERENCES CITED

The following references are of record in the file of this patent:

UNITED STATES PATENTS

| Number | Name | Date |
|---|---|---|
| 270,042 | Fell | Jan. 2, 1883 |
| 2,307,725 | Daly et al. | Jan. 5, 1943 |
| 2,348,451 | Christensen | May 9, 1944 |